A. NICKERSON.
Adjustable Spray-Jets.

No. 142,719.  Patented September 9, 1873.

Witnesses.
S. W. Piper
L. N. Möller

Amos Nickerson
by his attorney
R. H. Eddy

UNITED STATES PATENT OFFICE.

AMOS NICKERSON, OF EAST SOMERVILLE, MASSACHUSETTS.

IMPROVEMENT IN ADJUSTABLE SPRAY-JETS.

Specification forming part of Letters Patent No. 142,719, dated September 9, 1873; application filed July 5, 1873.

*To all whom it may concern:*

Be it known that I, AMOS NICKERSON, of East Somerville, of the county of Middlesex and State of Massachusetts, have invented a new and useful Adjustable Spray-Jet for watering plants or surfaces; and do hereby declare the same to be fully described in the following specification and represented in the accompanying drawings, of which—

Figure 1:
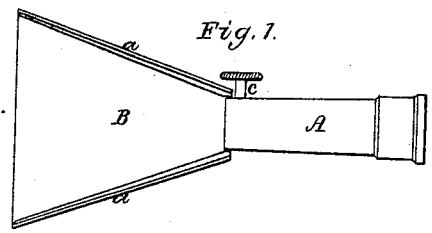
Figure 2:
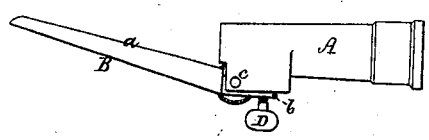
Figure 3:
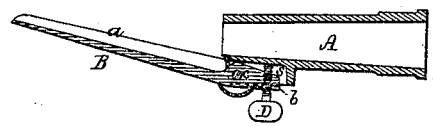
Figure 4:
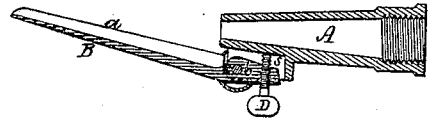

Figure 1 denotes a top view, Fig. 2 a side elevation, and Fig. 3 a longitudinal section, of it as applied to a common hose jet-tube or nozzle. Fig. 4 is a longitudinal section of it as constituting in itself a jet-tube.

In either case the part A is tubular, and it may be a jet-tube or a collar or sleeve to fit upon one.

In carrying out my invention, I pivot or hinge to the part A an adjustable stream spreader or deflector, B, having a trapezoidal shape, and provided on its two opposite edges with lips $a\ a$, raised on or above it, in manner as shown. The shank $b$ of it turns upon a pivot, $c$, extends into a socket, $s$, in the part A, and is provided with an adjusting-screw, D, which screws through it and against the base of the socket, as shown, the same being to admit of the spreader B being varied in its angular position relatively to the axis of the bore of the part A.

A stream of water, on emerging from the nose, or the sleeve A, as the case may be, will strike against the spreader, and by it will be spread out laterally in a fan shape, or be broken up into spray, according as the said part B may be adjusted with reference to the direction of emergence of the jet.

In watering plants or grass-plats or washing glass windows the article is of much value.

I disclaim a hose-pipe or spray-jet constructed as represented in the United States Patent No. 9,520, dated January 4, 1853, to Richard Hollings, as I dispense with the clasp for carrying the adjusting-screw, and apply such screw directly to the part $b$ of the deflector B, thereby greatly simplifying the apparatus. Nor do I claim a sprinkling apparatus made as shown in Joseph W. Douglass' rejected application for a patent, filed September 4, 1868, which has no adjusting-screw, but has a spring to the deflector-arm. In my apparatus I have no such spring, and I construct the jet-tube with a socket to receive the arm and screw of the deflector or spreader B.

I therefore claim—

The jet-tube A, the socket $s$, the spreader B, and the screws D, constructed, arranged, and connected or applied together as shown and described.

AMOS NICKERSON.

Witnesses:
 R. H. EDDY,
 S. N. PIPER.